United States Patent
Narayanan et al.

(10) Patent No.: US 11,689,914 B2
(45) Date of Patent: Jun. 27, 2023

(54) USING A MOBILE APPLICATION WITH A CLOUD SERVER TO MANAGE A HOME NETWORK

(71) Applicant: ARRIS Enterprises LLC, Suwanee, GA (US)

(72) Inventors: Muralidharan Narayanan, Karnataka (IN); Sathish Arumugam Chandrasekaran, Karnataka (IN); David F. Brumbaugh, Collegeville, PA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 17/463,763

(22) Filed: Sep. 1, 2021

(65) Prior Publication Data
US 2022/0095096 A1   Mar. 24, 2022

Related U.S. Application Data

(60) Provisional application No. 63/082,097, filed on Sep. 23, 2020.

(51) Int. Cl.
*H04W 8/24* (2009.01)
*H04W 72/51* (2023.01)
(Continued)

(52) U.S. Cl.
CPC .............. *H04W 8/24* (2013.01); *H04W 72/51* (2023.01); *H04W 72/53* (2023.01); *H04L 65/756* (2022.05)

(58) Field of Classification Search
CPC ........... H04W 8/00; H04W 8/22; H04W 8/24; H04W 72/04; H04W 72/0493;
(Continued)

(56) References Cited

U.S. PATENT DOCUMENTS 6,256,747 B1 * 7/2001 Inohara ............... H04L 41/0893
709/201
9,179,007 B1 * 11/2015 Yadav ................. H04L 41/0893
(Continued)

FOREIGN PATENT DOCUMENTS

| CN | 106445597 | * | 2/2017 | ............. H04L 67/34 |
| CN | 108848145 | * | 12/2021 | ........... H04L 67/141 |
| WO | 2012/001223 | | 1/2012 | |

OTHER PUBLICATIONS

International Search Report and the Written Opinion of the International Searching Authority dated Dec. 22, 2021 in International (PCT) Application No. PCT/US2021/048592.
(Continued)

*Primary Examiner* — Warner Wong
(74) *Attorney, Agent, or Firm* — Wenderoth, Lind & Ponack, L.L.P.

(57) ABSTRACT

An apparatus, method, and computer-readable recording medium perform client configuration of a managed device in a wireless network. A client device retrieves capabilities data from an Internet-based cloud server, builds a user interface (UI) based upon the user defined capabilities data and managed service defined capabilities data, sends a data request to the managed device, receives managed device state data from the managed device, sends command to update the managed device, and when the update of the managed device is complete, instructs managed device to send current user defined capabilities data and managed service defined capabilities data to the Internet-based cloud server.

20 Claims, 4 Drawing Sheets

(51) Int. Cl.
*H04W 72/53* (2023.01)
*H04L 65/756* (2022.01)

(58) Field of Classification Search
CPC .............. H04W 72/00; H04W 72/048; H04W 28/0215; H04L 69/24; H04L 65/756
See application file for complete search history.

(56) References Cited

U.S. PATENT DOCUMENTS

| | | | |
|---|---|---|---|
| 2003/0035010 A1* | 2/2003 | Kodosky | G06F 8/61 715/771 |
| 2006/0259604 A1* | 11/2006 | Kotchavi | H04L 41/0893 709/223 |
| 2008/0215727 A1* | 9/2008 | Denis | H04L 41/147 709/227 |
| 2012/0005586 A1* | 1/2012 | Uola | G06F 9/4416 715/740 |
| 2014/0101279 A1* | 4/2014 | Nagami | G06F 3/061 709/213 |
| 2015/0081633 A1* | 3/2015 | Su | G06F 11/1464 707/634 |
| 2017/0310752 A1* | 10/2017 | Knothe | H04L 67/55 |
| 2017/0346682 A1* | 11/2017 | Ni | H04L 67/34 |
| 2019/0097885 A1* | 3/2019 | Baxa | H04L 41/0681 |
| 2019/0268244 A1* | 8/2019 | Blakeman | G06F 3/04847 |
| 2020/0012493 A1* | 1/2020 | Sagy | G06F 11/3428 |
| 2020/0213664 A1 | 7/2020 | Novoa, III | |
| 2020/0295995 A1* | 9/2020 | Baxa | H04L 41/0866 |
| 2021/0160145 A1* | 5/2021 | Barnard | H04L 41/0226 |
| 2021/0392156 A1* | 12/2021 | Singh | H04L 41/0253 |
| 2022/0141098 A1* | 5/2022 | Madala | H04L 41/0859 709/223 |

OTHER PUBLICATIONS

International Preliminary Report on Patentability and Written Opinion dated Apr. 6, 2023 in International Application No. PCT/US2021/048592.

* cited by examiner

USING A MOBILE APPLICATION WITH A CLOUD SERVER TO MANAGE A HOME NETWORK

TECHNICAL FIELD

The subject matter of the present disclosure relates generally to management and control of wireless devices in a wireless network.

BACKGROUND

There has been a rapid rise in the use of wireless devices in wireless networks, which has increased traffic drastically, degraded the quality of service, and reduced the coverage capabilities of many network devices (e.g., gateways, access points, and wireless extenders). The wireless industry recognized these issues and developed standards for routing protocols such as a multi-access point (MAP) or mesh protocol, which allows wireless devices to communicate with each other using optimal paths for relaying data in the wireless network. The MAP or mesh protocol defines the control protocols and the data objects necessary to enable onboarding, provisioning, control, and management of wireless devices in a wireless network.

A wireless network implementing the MAP or mesh protocol (e.g., MAP or mesh network) generally includes the use of a MAP control device for the control and management of devices in the wireless network to improve the quality of experience (QoE) for users. Additionally, there have been advances in the remote management of a wireless device on a wireless network. For example, a user can access and configure a wireless-managed device using a mobile application on a client device while the client device is located directly attached to a home network as well as while remotely communicating with the managed device over the Internet.

There are various types of managed devices, each of which may have a unique set of settings and parameters which may be configured by the user via the mobile application. The set of available features to be configured also may change over time as new versions of firmware are made available for installation onto the managed devices. Manufacturers of the managed devices and network operators, including internet service providers, also may wish to time the release of these new features for both regulatory approval reasons as well as business and marketing reasons.

Thus, it would be advantageous and an improvement over the relevant technology to provide configuring managed devices from a client device that provides control over the timing of release of new features, capabilities, and related control settings. The control of the timing for the release of these new features may address both the activation of the new capabilities within the managed devices and the presentation of the existence of the new capabilities to users of the mobile application on the client device within a user interface (UI) of the mobile applications. As such, the present invention attempts to address and overcome the limitations and deficiencies in prior solutions of remote configuration of managed devices according to the principles and example embodiments disclosed herein.

SUMMARY

An aspect of the present disclosure provides a managed device for client configuration in a wireless network. The wireless network is configured to communicatively interconnect the managed device and one or more client devices. In this aspect of the present disclosure, the client device includes a client controller, a non-transitory memory storing a program, and a communication interface configured to establish communication connections with the managed device via the wireless network.

In an aspect of the present disclosure, the client device is configured to execute the program to cause the client device to instruct the managed device to send current user defined capabilities data and managed service defined capabilities data to the cloud server when managed device update is complete.

In an aspect of the present disclosure, the client device is configured to execute the program to cause the client device to instruct the managed device to send current user defined capabilities data and managed service defined capabilities data to an Internet-based cloud server according to a predefined schedule.

In an aspect of the present disclosure, the client device is configured to execute the program to cause the client device to send a current user defined capabilities data and managed service defined capabilities data to an Internet-based cloud server when the managed device update is complete.

In an aspect of the present disclosure, the managed device comprises a modem device and a gateway device.

In an aspect of the present disclosure, the wireless home network further comprises one or more wireless extender devices and the managed device controls configuration of the one or more wireless extender devices.

In an aspect of the present disclosure, the Internet-based cloud server is operated by a managed service operator.

In an aspect of the present disclosure, the managed service operator comprises an interne service provider, a wireless network operator, and the managed device manufacturer.

An aspect of the present disclosure provides a method for network device configuration of a managed device in a wireless home network. The wireless network is configured to communicatively interconnect a managed device and one or more client devices. The method includes retrieving, by the client device, user defined capabilities data and managed service defined capabilities data from an Internet-based cloud server; building, by the client device, a user interface (UI) based upon the user defined capabilities data and managed service defined capabilities data; sending, by the client device, a data request to the managed device; receiving, by the client device, managed device state data from the managed device; and sending, by the client device, a command to update the managed device.

The method also includes instructing the managed device to send current capabilities data to the cloud server when the managed device update is complete.

The method also includes instructing the managed device to send current capabilities data to the cloud server according to a predefined schedule.

The method also includes sending current capabilities data to the cloud server when the managed device update is complete.

An aspect of the present disclosure provides a non-transitory computer-readable recording medium in a client device for client configuration of a managed device in a wireless network, the wireless network configured to communicatively interconnect the managed device and one or more client devices, the non-transitory computer-readable recording medium storing one or more programs which when executed by a client controller of the client device performs steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
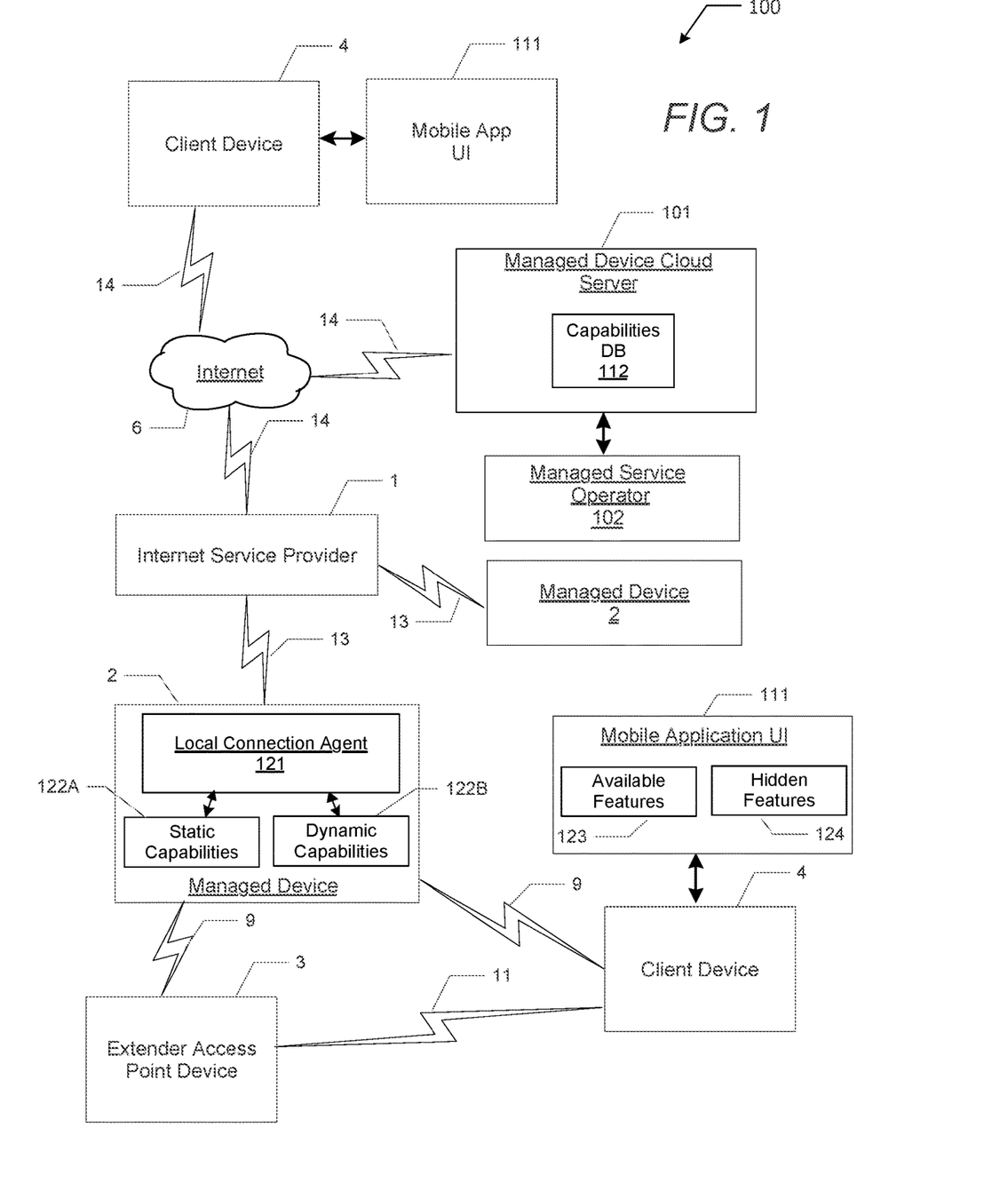
FIG. 1 is a schematic diagram of a system according to an embodiment of the present disclosure.

FIG. 1 is a schematic diagram of a system according to an embodiment of the present disclosure. As shown in FIG. 1, the main elements of the system include one or more managed devices 2 connected to the Internet 6 via an internet service provider (ISP) 1 and also connected to different wireless devices such as wireless extenders 3 and client devices 4. The system shown in FIG. 1 includes wireless devices (e.g., wireless extenders 3 and client devices 4) that may be connected in one or more wireless networks (e.g., private, guest, iControl, backhaul, or Internet of things (IoT) networks) within the system. Additionally, there could be some overlap between wireless devices (e.g., wireless extenders 3 and client devices 4) in the different networks. That is, one or more network devices could be located in more than one network. For example, the wireless extenders 3 could be located both in a private network for providing content and information to a client device 4 and also included in a backhaul network or an iControl network.

The present invention provides a mechanism for users of a wireless network created by a managed device 2 to configure the wireless network. The client device 4 may contain a mobile application that enables the user to configure the managed device 2 by connecting the client device 4 to the managed device 2 using either a connection on the wireless network or a remote connection over the Internet 2. The mobile application within the client device 4 presents the user with a set of controls that set and modify the functionality of the managed device 2. The mobile application presents user-editable features and settings to the user of the client device 4 by constructing a mobile application user interface (UI) 111 that presents all features and settings currently available 123 to the user for use in configuring the managed device 2. The mobile application UI 111 may also include a set of hidden features 124 and controls that have not been enabled for user editing that may exist within the managed device 2, but are not included within the mobile application UI 111 until these features are enabled for use.

Starting with the ISP of FIG. 1, the ISP 1 can be, for example, a streaming video provider or any computer and other associated equipment for connecting the managed device 2 to the Internet 6. The connection 14 between the Internet 6 and the ISP 1 and the connection 13 between the ISP 1 and the managed device 2 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC) networks), a digital subscriber line, a public switched data network (PSDN), a global Telex network, or 2G, 3G, 4G or 5G networks, for example.

The connection 13 can further include as some portion thereof a broadband network connection, an optical network connection or other similar connections. For example, the connection 13 also can be implemented using a fixed wireless connection that operates in accordance with, but is not limited to, 3rd Generation Partnership Project (3GPP), Long Term Evolution (LTE) or 5G protocols.

The managed device 2 can be, for example, a hardware electronic device that may be a combination modem and gateway device that combines the functions of a modem, an access point, and/or a router for providing content received from the content provider 1 to network devices (e.g., wireless extenders 3 and client devices 4) in the system. It is also contemplated by the present disclosure that the managed device 2 can include the function of, but is not limited to, an Internet Protocol/Quadrature Amplitude Modulator (IP/QAM) set-top box (STB) or smart media device (SMD) that is capable of decoding audio/video content, and playing over-the-top (OTT)- or multiple system operator (MSO)-provided content.

The managed device 2 may include a local connection agent 121 and a set of user defined capabilities data 122A and managed service defined capabilities data 122B that control operation of the functions performed by the managed device 2. The user defined capabilities data 122A define a set of user editable portions of the managed device's capabilities. This user defined capabilities data 122A define settings within the managed device 2 that have been enabled for use and control by a user via a mobile application within a client device. In contrast, the managed service defined capabilities data 122B define a set of service provider editable capabilities that are present within the managed device 2 to enable and to make available features and functions by a managed service operator 102 to the user of the mobile application.

The managed service operator 102 utilizes the managed service defined capabilities data 122B to enable and disable functions that may be present within the managed device 2 for reasons associated with the managed service operator 102. For example, a managed service operator 102 may provide a firmware update to all managed devices 2 that may be installed within the managed device's memory that controls the operation of the managed device 2. Within a given firmware update, one or more new functions may be included for use by the managed devices 2. In some circumstances, the managed service operator 102 may wish to publish a new firmware update to permit users of the managed devices 2 to install the firmware update at their convenience. However, the managed service operator 102 may not want to enable the new feature within the firmware update immediately. The managed service operator 102 may wish to wait before enabling the feature while regulatory approval of the new feature is obtained while wanting to immediately enable the feature on all managed devices 2 at one time once the approval has been granted. Additionally, the managed service provider 102 may wish to delay enabling a new feature as part of a marketing campaign that desires to make the feature available at a highly publicized time as a possible way to create interest in the launch of the new feature. Finally, the managed service provider 102 may wish to not support a particular feature on its particular network of managed devices 2 where another managed service provider 102 may desire to provide that same feature. The managed service defined capabilities data 122B provide a mechanism for the managed service provider 102 to control one or more supported features outside of the control of the users.

In the above example, the managed service providers 102 may include an ISP 1, a network control organization, and an equipment manufacturer that provides managed services to users of its network devices. The managed service providers 102 typically are responsible for the operation of the wide area network or a connection to the Internet to which the managed device 2 is intended to extend into an attached wireless network for a particular user or set of users, such as a residential home wireless network. The managed service provider 102 also typically operates an Internet-based cloud server 101 to store a copy of the capabilities data for each managed device 2 within a capabilities database 112. This database 112 provides the managed service provider 102 a location to edit the service provider editable dynamic capabilities 122B that may be used to update the managed device when the user launches the mobile application on the client device 4.

When the mobile application is launched, the client device 4 may connect to the internet-based cloud server 101 to obtain a copy the capabilities data for a particular managed device 2. The mobile application will obtain a current copy of the user defined capabilities data 122A and the managed service capabilities data 122B from the capabilities database 112 for use in creating its mobile application UI 111 and to update the settings in the managed device 2. If the managed service operator 102 has updated the dynamic capabilities data 122B, such as when a new feature previously installed in the firmware of the managed device 2 is to be enabled for use, the mobile application will use the provided dynamic capabilities 122B to update the operation of the managed device 2.

Returning to the wireless network of FIG. 1, the connection 9 between the managed device 2, the wireless extenders 3, and client devices 4 can be implemented using a wireless connection in accordance with any IEEE 802.11 Wi-Fi protocols, Bluetooth protocols, Bluetooth Low Energy (BLE) protocols, or other short range protocols that operate in accordance with a wireless technology standard for exchanging data over short distances using any licensed or unlicensed band such as the citizens broadband radio service (CBRS), 2.4 GHz, 5 GHz, and 6 GHz bands. Additionally, the connection 9 can be implemented using a wireless connection that operates in accordance with, but is not limited to, RF4CE, ZigBee, Z-Wave, and IEEE 802.15.4 protocols. It is also contemplated by the present disclosure that the connection 9 can include connections to a media over coax (MoCA) network. One or more of the connections 9 also can be a wired Ethernet connection.

The wireless extenders 3 can be, for example, hardware electronic devices such as access points used to extend the wireless network by receiving the signals transmitted by the managed device 2 and rebroadcasting the signals to, for example, client devices 4, which may be out of range of the managed device 2. The wireless extenders 3 also can receive signals from the client devices 4 and rebroadcast the signals to the managed device 2, or other client devices 4.

The connection 11 between the wireless extenders 3 and the client devices 4 are implemented through a wireless connection that operates in accordance with any IEEE 802.11 Wi-Fi protocols, Bluetooth protocols, Bluetooth Low Energy (BLE) protocols, or other short range protocols that operate in accordance with a wireless technology standard for exchanging data over short distances using any licensed or unlicensed band such as the CBRS, 2.4 GHz, 5 GHz and 6 GHz bands. Additionally, the connection 11 can be implemented using a wireless connection that operates in accordance with, but is not limited to, RF4CE, ZigBee, Z-Wave, or IEEE 802.15.4 protocols. Also, one or more of the connections 11 can be a wired Ethernet connection.

The client devices 4 can be, for example, hand-held computing devices, personal computers, electronic tablets, smart phones, smart speakers, IoT devices, iControl devices, portable music players with smart capabilities capable of connecting to the Internet, and cellular networks all interconnecting with other devices via Wi-Fi and Bluetooth, or other wireless hand-held consumer electronic devices capable of executing and displaying content received through the managed device 2. Additionally, the client devices 4 can be a TV, an IP/QAM STB or an SMD that is capable of decoding audio/video content and playing over OTT- or MSO-provided content received through the managed device 2.

The connection 10 between the managed device 2 and the client device 4 is implemented through a wireless connection that operates in accordance with, but is not limited to, any IEEE 802.11 protocols. Additionally, the connection 10 between the managed device 2 and the client device 4 also can be implemented through a: WAN, LAN, VPN, MANs, PANs, WLANs, SANs, DOCSIS network, fiber optics network (e.g., FTTH, FTTX, or HFC), PSDN, global Telex network, and 2G, 3G, 4G or 5G networks, for example.

The connection 10 also can be implemented using a wireless connection in accordance with Bluetooth protocols, Bluetooth Low Energy (BLE) protocols, or other short range protocols that operate in accordance with a "Wireless" technology standard for exchanging data over short distances using any licensed or unlicensed band such as the CBRS, 2.4 GHz, 5 GHz, and 6 GHz bands. One or more of the connections 10 also can be a wired Ethernet connection.

In the embodiment of FIG. 1, a second managed device 2 also may be connected to the Internet 6 via the ISP 1. This second managed device 2 may provide a separate network to a different set of network devices. For example, the second managed device 2 may provide video streaming capabilities to network devices and/or may provide voice-over-IP telephone services that are separate from the wireless network. The second managed device 2 includes the user defined capabilities data and managed service defined capabilities data and interacts with the Internet-based cloud server 101 as discussed above.

Figure 2:
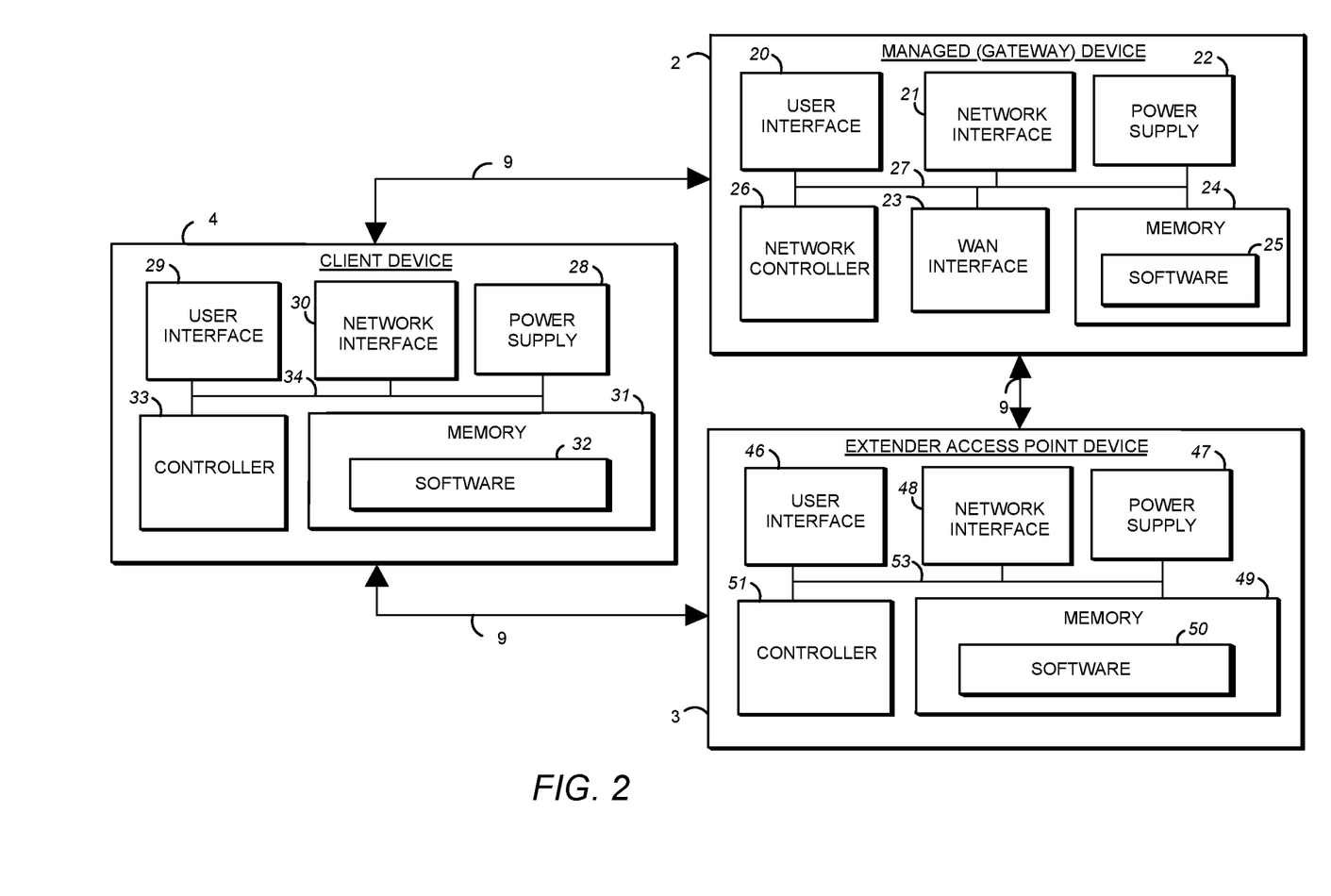
FIG. 2 is a more detailed schematic diagram of an exemplary managed device, client device, and wireless extender implemented in the system of FIG. 1 according to an embodiment of the present disclosure.

A detailed description of the exemplary internal components of the managed device 2, the wireless extenders 3, and the client devices 4 shown in FIG. 1 will be provided in the discussion of FIG. 2. However, in general, it is contemplated by the present disclosure that the managed device 2, the wireless extenders 3, and the client devices 4 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the managed device 2, the wireless extenders 3, and the client devices 4 may be adapted to execute any operating system, including Linux, UNIX, Windows, MacOS, DOS, and ChromeOS as well as virtual machines adapted to virtualize execution of a particular operating system, including customized and proprietary operating systems. The managed device 2, the wireless extenders 3, and the client devices 4 are further equipped with components to facilitate communication with other computing devices over the one or more network connections to local and wide area networks, wireless and wired networks, public and private networks, and any other communication network enabling communication in the system.

FIG. 2 is a more detailed schematic diagram of an exemplary managed device, client device, and wireless extender implemented in the system of FIG. 1 according to an embodiment of the present disclosure. Although FIG. 2 only shows one wireless extender 3 and one client device 4, the wireless extender 3 and the client device 4 shown in the figure are meant to be representative of the other wireless extenders 3 and client devices 4 shown in FIG. 1. Similarly, the connections 9 between the gateway device 2, the wireless extender 3, and the client device 4 shown in FIG. 2 are meant to be exemplary connections and are not meant to indicate all possible connections between the gateway devices 2, wireless extenders 3, and client devices. Additionally, it is contemplated by the present disclosure that the number of gateway devices 2, wireless extenders 3, and client devices 4 is not limited to the number of gateway devices 2, wireless extenders 3, and client devices 4 shown in FIGS. 1 and 2.

Now referring to FIG. 2 (e.g., from left to right), the client device 4 can be, for example, a computer, a portable device, an electronic tablet, an e-reader, a PDA, a smart phone, a smart speaker, an IoT device, an iControl device, portable music player with smart capabilities capable of connecting to the Internet, and cellular networks, and interconnect with other devices via Wi-Fi and Bluetooth or other wireless hand-held consumer electronic device capable of executing and displaying the content received through the gateway device 2. Additionally, the client device 4 can be a TV, an IP/QAM STB, or an SMD that is capable of decoding audio/video content and playing over OTT- or MSO-provided content received through the gateway device 2.

As shown in FIG. 2, the client device 4 includes a power supply 28, user interface 29, network interface 30, a memory 31, and a controller 33. The power supply 28 supplies power to the internal components of the client device 4 through the internal bus 34. The power supply 28 can be a self-contained power source such as a battery pack with an interface powered by an electrical charger connected to an outlet (e.g., either directly or by way of another device). The power supply 28 also can include a rechargeable battery that can be detached allowing for replacement such as with nickel-cadmium (NiCd), nickel metal hydride (NiMH), a lithium-ion (Li-ion), or a lithium polymer (Li-pol) batteries.

The UI 29 includes, but is not limited to, push buttons, a keyboard, a keypad, a liquid crystal display (LCD), a cathode ray tube (CRT), a thin film transistor (TFT), a light-emitting diode (LED), a high definition (HD) or other similar display devices including a display device having touch screen capabilities so as to allow interaction between a user and the client device 4. The network interface 30 can include, but is not limited to, various network cards, interfaces, and circuitry implemented in software and/or hardware to enable communications with the gateway device 2 and the wireless extender 3 using the wireless protocols in accordance with the connection 9 (e.g., as described with reference to FIG. 1).

The memory 31 includes a single memory or one or more memories or memory locations that include, but are not limited to, a random access memory (RAM), a dynamic random access memory (DRAM) a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy. The memory 31 can be used to store any type of instructions, software, or algorithms for controlling the general function and operations of the client device 4 in accordance with the embodiments described in the present disclosure (e.g., including optimized onboarding of devices according to the embodiments of the present disclosure).

The controller 33 controls the general operations of the client device 4 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the client device 4 in accordance with the embodiments described in the present disclosure. Communication between the components (e.g., 28-31 and 33) of the client device 4 may be established using an internal bus 34.

The wireless extender 3 can be, for example, a hardware electronic device such as an access point used to extend a wireless network by receiving the signals transmitted by the gateway device 2 and rebroadcasting the signals to client devices 4, which may be out of range of the gateway device 2. The wireless extender 3 also can receive signals from the client devices 4 and rebroadcast the signals to the gateway device 2, mobile device 5, or other client devices 4.

As shown in FIG. 2, the wireless extender 3 includes a user interface 46, a power supply 47, a network interface 48, a memory 49, and a controller 51. The user interface 46 can include, but is not limited to, push buttons, a keyboard, a keypad, an LCD, a TFT, an LED, an HD or other similar display device including a display device having touch screen capabilities so as to allow interaction between a user and the wireless extender 3. The power supply 47 provides power to the internal components of the wireless extender 3 through the internal bus 53. The power supply 47 can include a self-contained power source such as a battery pack with an interface powered by an electrical charger connected to an outlet (e.g., either directly or by way of another device). The power supply 47 also include a rechargeable battery that can be detached allowing for replacement such as with a NiCd, a NiMH, a Li-ion, or a Li-pol battery.

The network interface 48 can include various network cards, interfaces, and circuitry implemented in software and/or hardware to enable communications with the client device 4 and the gateway device 2 using the wireless protocols in accordance with the connection 9 (e.g., as described with reference to FIG. 1). The memory 49 can include a single memory or one or more memories or memory locations that include, but are not limited to a RAM, a DRAM, a memory buffer, a hard drive, a database, an EPROM, an EEPROM, a ROM, a flash memory, logic blocks of an FPGA, hard disk or any other various layers of memory hierarchy.

The memory 49 can be used to store any type of instructions, software, or algorithm including software 50 for controlling the general functions and operations of the wireless extender 3 in accordance with the embodiments described in the present disclosure (e.g., including client configuration of managed devices according to the embodiments of the present disclosure).

The controller 51 controls the general operations of the wireless extender 3 and can include, but is not limited to, a CPU, a hardware microprocessor, a hardware processor, a multi-core processor, a single core processor, an FPGA, a microcontroller, an ASIC, a DSP, or other similar processing device capable of executing any type of instructions, algorithms, or software for controlling the operation and functions of the wireless extender 3 in accordance with the embodiments described in the present disclosure. General communication between the components (e.g., 46-49 and 51) of the wireless extender 3 may be established using the internal bus 53.

The managed device 2 can be, for example, a hardware electronic device that can combine the functions of a modem, an access point, and/or a router for providing content received from the content provider 1 to network devices (e.g., wireless extenders 3, client devices 4, and mobile device 5) in the system. It is also contemplated by the present disclosure that the gateway device 2 can include the function of, but is not limited to, an IP/QAM STB or SMD that is capable of decoding audio/video content, and playing OTT- or MSO-provided content.

As shown in FIG. 2, the managed device 2 includes a user interface 20, a network interface 21, a power supply 22, a WAN interface 23, a memory 24, and a network controller 26. The user interface 20 can include, but is not limited to, push buttons, a keyboard, a keypad, an LCD, a CRT, a TFT, an LED, an HD or other similar display device including a display device having touch screen capabilities so as to allow interaction between a user and the gateway device 2. The network interface 21 may include various network cards, and circuitry implemented in software and/or hardware to enable communications with the wireless extender 3 and client device 4 using the wireless protocols in accordance with connection 9 (e.g., as described with reference to FIG. 1). Additionally, the various network cards, interfaces, and circuitry of the network interface 21 enable communications with the mobile device using the wireless protocols in accordance with the connection 10 (e.g., as described with reference to FIG. 1).

The power supply 22 provides power to the internal components of the gateway device 2 through the internal bus 27. The power supply 22 can be a self-contained power source such as a battery pack with an interface powered by an electrical charger connected to an outlet (e.g., either directly or by way of another device). The power supply 22 also can include a rechargeable battery that can be detached allowing for replacement such as with a NiCd, a NiMH, a Li-ion, or a Li-pol battery. The WAN interface 23 may include various network cards and circuitry implemented in software and/or hardware to enable communications between the gateway device 2 and the ISP 1 using the wireless protocols in accordance with the connection 13 (e.g., as described with reference to FIG. 1).

The memory 24 includes a single memory or one or more memories or memory locations that include, but are not limited to, a RAM, a DRAM, a memory buffer, a hard drive, a database, an EPROM, an EEPROM, a ROM, a flash memory, logic blocks of a FPGA, hard disk or any other various layers of memory hierarchy. The memory 24 can be used to store any type of instructions, software, or algorithm including software 25 for controlling the general functions and operations of the gateway device 2 and performing management functions related to the other devices (wireless extenders 3 and client device 4) in the network in accordance with the embodiments described in the present disclosure (e.g., including client configuration of managed devices according to the embodiments of the present disclosure).

The network controller 26 controls the general operations of the gateway device 2 as well as performs management functions related to the other devices (wireless extenders 3 and client device 4) in the network. The network controller can include, but is not limited to, a CPU, a hardware microprocessor, a hardware processor, a multi-core processor, a single core processor, a FPGA, a microcontroller, an ASIC, a DSP, or other similar processing device capable of executing any type of instructions, algorithms, or software for controlling the operation and functions of the gateway device 2 in accordance with the embodiments described in the present disclosure. Communication between the components (e.g., 20-24, and 26) of the managed device 2 may be established using the internal bus 27.

One of ordinary skill will note that the Internet-based cloud server 101 of FIG. 1 is also a general purpose computing device similar to the three programmable computing devices shown in FIG. 2. Typically, the Internet-based cloud server 101 will be constructed with all of the same elements disclosed above with respect to the managed device 2, the client device 4, and the extender device 3, while providing significantly more computational capacity than the devices shown in FIG. 2. For any functions provided by the Internet-based cloud server 101 as disclosed herein, these functions may be performed as programmable instructions executed by a processor within an Internet-based cloud server 101 in the same manner as described above.

Figure 3:
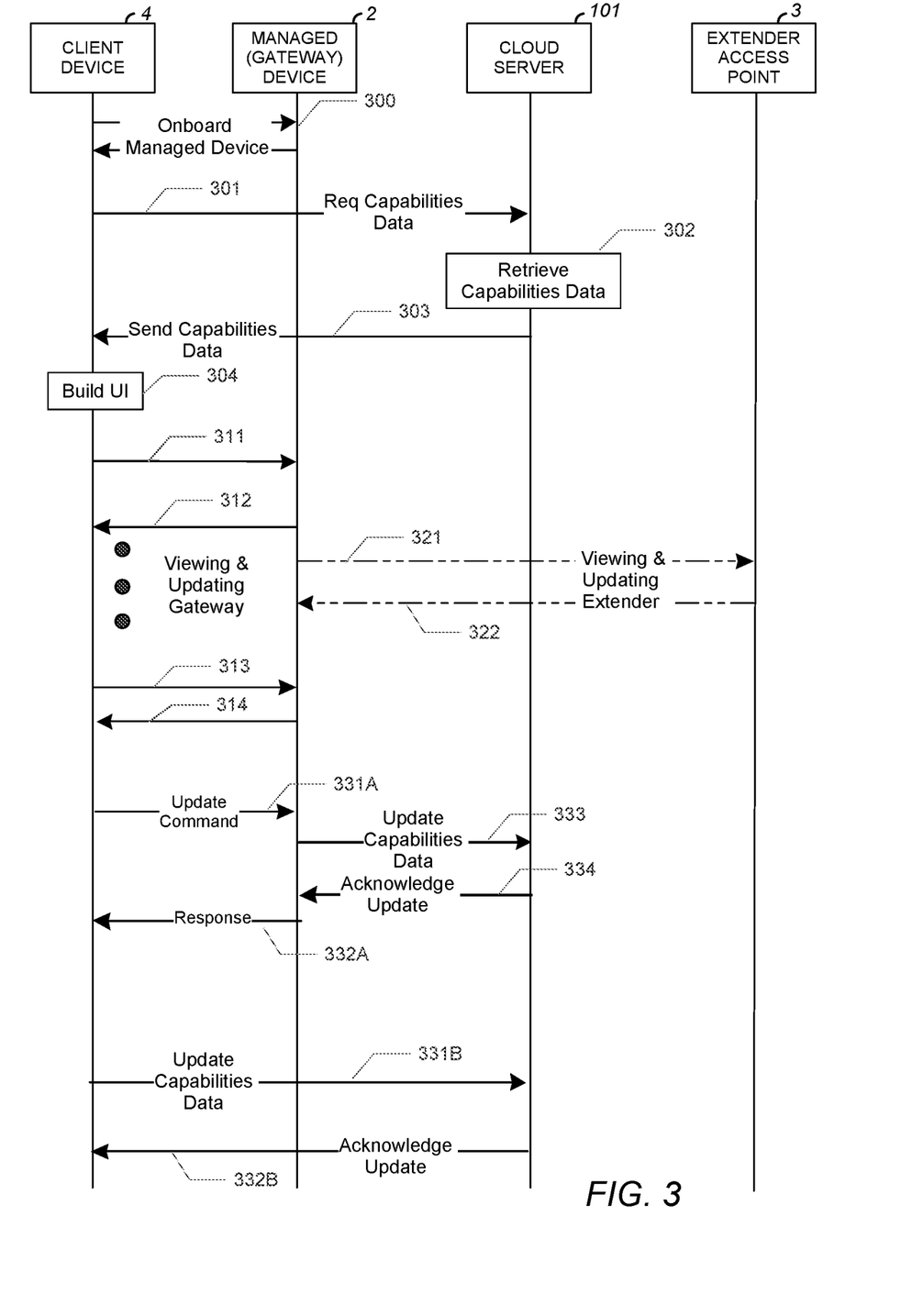
FIG. 3 illustrates a method and algorithm for configuring a managed device in a wireless network from a client device according to an embodiment of the present disclosure.

FIG. 3 illustrates a method and algorithm for configuring a managed device in a wireless network from a client device according to an embodiment of the present disclosure. In FIG. 3, it is assumed that the client device 4, the managed device 2, Internet-based cloud server 101, and Wi-Fi extender 3 include their respective software 25, 32, 50 stored in their respective memories 24, 31, 49, which when executed by their respective controllers 26, 33, 51, perform the functions and operations in accordance with the embodiments described in the present disclosure (e.g., including optimized onboarding of devices according to the embodiments of the present disclosure).

Although FIG. 3 shows one managed device 2, one client device 4, one wireless extender 3, and one Internet-based cloud server 101, it is contemplated by the present disclosure that the method and algorithm can be applied to any number of managed devices 2, client devices 4, wireless extenders 3, and Internet-based cloud server 101 for providing client configuration of managed devices to any number of wireless networks in the system of FIG. 1. The process begins when a managed device 2 is onboarded to create a wireless network or to be added to an existing wireless network in step 300. The client device 4 and the managed device 2 interact with a series of exchanged messages to set up the managed device 2 and define all user defined capability settings. When complete, the client device 4 retains a copy of user defined capabilities data corresponding to the present settings.

In step 301, a mobile application within the client device 4 begins configuring a managed device 2 when the client device sends a request for user defined capabilities data and managed service defined capabilities data for a particular managed device 2 to the Internet-based cloud server 101. The Internet-based cloud server 101 searches its capabilities database 112 to obtain the user defined capabilities data and managed service defined capabilities data for the particular managed device 2 in step 302. The Internet-based cloud server 101 may use a unique identifier such as serial number for the managed device 2 and a device identifier associated with a particular model of managed device 2 to maintain and retrieve user defined capabilities data and managed service defined capabilities data for each managed device within the capabilities database 112. The Internet-based cloud server 101 returns the user defined capabilities data and managed service defined capabilities data for the managed device 2 to the client device 4 in step 303. In the event that the managed device 2 has not yet had the user defined capabilities data and managed service defined capabilities data saved onto the cloud server 101, the managed device 4 receives such an indication and uses previously stored local copy of the user defined capabilities data and managed service defined capabilities data.

Once the client device 4 possesses the user defined capabilities data and managed service defined capabilities data for the particular managed device 4, the client device 4 builds a current mobile application UI 111, in step 304, for use by the user to configure the managed device 2. As noted above with respect to FIG. 1, the mobile application UI 111 will present to the user only UI elements that are currently both present and enabled for configuration of the managed device. For example, some managed devices 2 may not support all possible features of all managed devices depending upon age, model, firmware version, and the like of a particular managed device. The mobile UI 111 only presents UI elements for the features present in the managed device 2. Similarly, features that may be present in the managed device 2, but are hidden and not enabled by a managed service operator 102 are also not presented to the user in the mobile application UI 111.

Once the mobile application UI 111 has been constructed in step 304, the user may begin a configuration session with the managed device 2 by sending a request 311 to the managed device 2. This request may include a request for the current state settings and operating status of the managed device 2 to populate the mobile application UI 111. The managed device 2 responds as required in step 312 to provide the client device 4 the requested data. The typical current state data provided by the managed device 4 may include the SSID for the wireless network, identities of any network devices active on the wireless network, and any of the operating parameters associated with the wireless network.

A sequence of commands and requests 313 by the client device 4 and corresponding responses 314 continue as long as the user of the client device 4 wishes to examine the operating status of the managed device 2 and possibly set and/or change the configuration of the managed device 2. The sequence of commands and responses may contain any number of messages back and forth between the client device 4 and the managed device 2. Any extender devices 3 that may be present on the wireless network to provide enhanced coverage range of the wireless network are not considered to be managed devices under the control of capabilities data stored on the Internet-based cloud server 101. These extender devices 3 are controlled by the managed device 2 that creates the wireless network and permits the extender devices 3 to become attached to and part of the wireless network.

During the configuration session shown in FIG. 3, the user may wish to check and configure an extender device 3 that is present on the wireless network. Such activity by the client device 4 only occurs when such configuration of wireless extender devices 3 is included and enabled within the managed device 2. Should such activity be permitted, the session of commands between the client device 4 and the managed device 2 may include a sequence of messages 321 from the managed device 2 to the extender device 3 and corresponding response messages 322 from the extender device 3 to the managed device 2.

When the user has completed the configuration session with the managed device 2 with the sending and receiving of the last messages 313-314, the client device may end any further action or may begin a different configuration session with another managed device 2. This additional managed device 2 has its own unique set of capabilities 122A-122B to be retrieved from the capabilities database 112 on the Internet-based cloud server 101. The client device will create a new mobile application UI 111 for the new managed device 2 based upon its current enabled features. A session of requests and corresponding responses 311-314 follows in the same manner disclosed above for the first managed device 2.

The final step of the managed device 2 configuration process 300 is to provide an update to the capabilities database 112 to include any changes to the user editable status capabilities 122A made during the above session between the client device 4 and the managed device 4. In a preferred embodiment, the current user defined capabilities data and managed service defined capabilities data is sent from the managed device 4 directly to the Internet-based cloud server 101. Typically, this update of the capabilities database 112 is performed when the client device 4 ends its configuration session as described above. In such a case, the session ends with the client device sending a session end command 331A to the managed device 4. The managed device 4 responds by sending the current user defined capabilities data and managed service defined capabilities data 333, including all of the changes made in the above session to the Internet-based cloud server 101. The Internet-based cloud server 101 responds 334 with an acknowledgement to indicate a successful update to the capabilities database 112. The managed device 4 may then return an update acknowledgement 332A to the client device 4 and the process ends.

In an alternate embodiment, the client device 4 may send the current user defined capabilities data and managed service defined capabilities data 331B, including all of the changes made in the above session, directly to the Internet-based cloud server 101. The Internet-based cloud server 101 responds 332B with an acknowledgement to indicate a successful update to the capabilities database 112. The Internet-based cloud server 101 may receive the updated capabilities data from either source once the configuration session ends.

Additionally, the above examples assume that the capabilities database 112 is updated immediately after the configuration session ends. Of course, the update to the capabilities database 112 may occur at a later date, such as at a predefined schedule which may provide periodic updates to the database 112 without requiring a configuration session. Additionally, the Internet-based cloud server 101 may not be available when the configuration session ends for many reasons, including technical failures, routine maintenance, and communications problems with the Internet. In this final case, the managed device 2 or the client device 4 may attempt the database update at a later time such as after a predefined delay or at a scheduled time.

Figure 4:
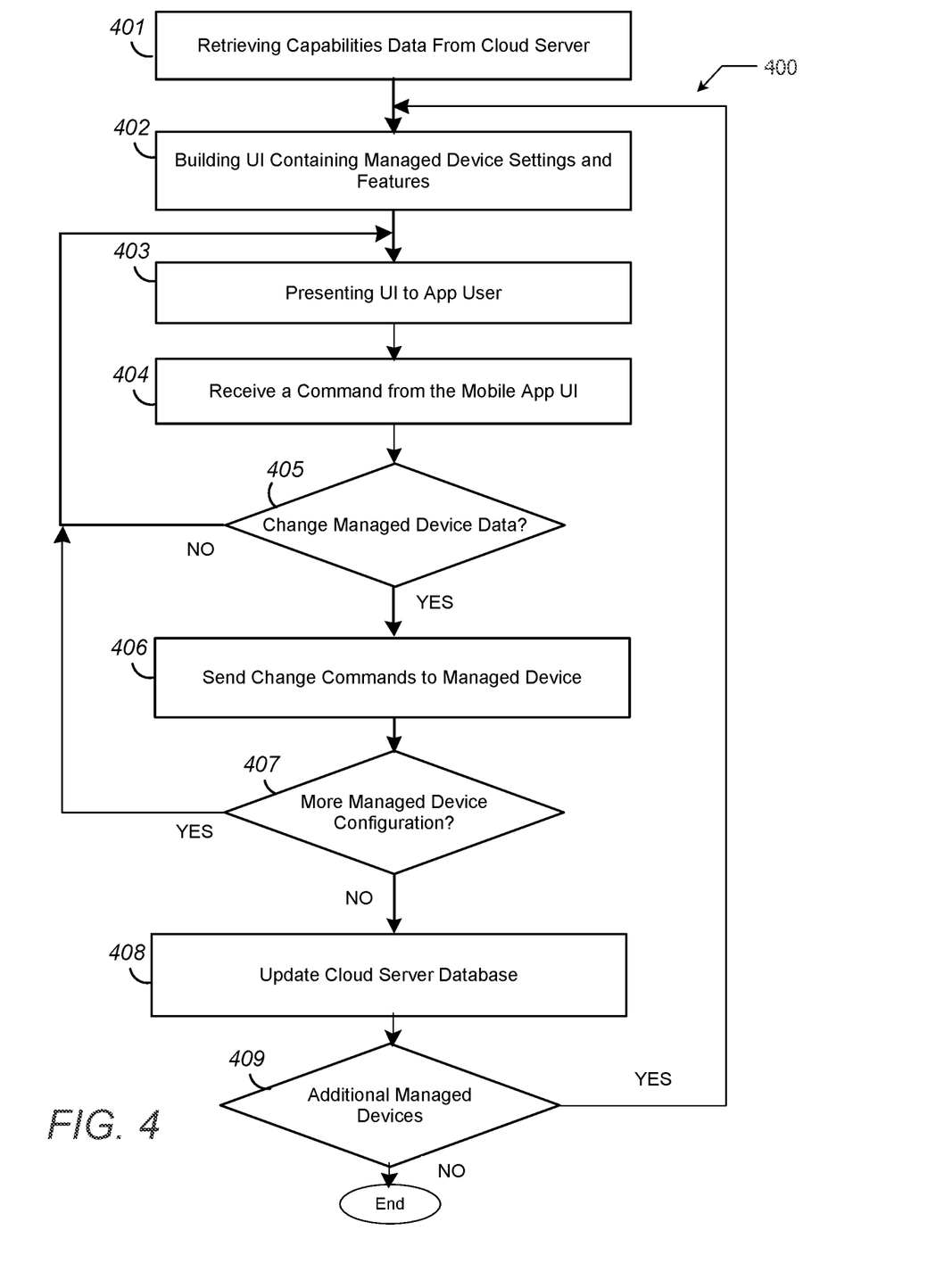
FIG. 4 illustrates a method and algorithm for configuring a managed device in a wireless network according to an embodiment of the present disclosure.

FIG. 4 illustrates a method and algorithm for configuring a managed device in a wireless network according to an embodiment of the present disclosure. The exemplary method and algorithm of FIG. 4 illustrate the action taken by the client device 4 when client configuration of a managed device 2 is to occur. The process 400 begins when the client device 4 retrieves the capabilities data, in step 401, that is associated with a particular managed device 2 stored within the capabilities database 112. In step 402 the client device uses the retrieved capabilities data to build a mobile application UI 111 for the particular managed device 2 to be configured.

Using the constructed mobile application UI 111, the user of the client device receives the mobile application UI 111 in step 402 to engage the managed device 2 in a configuration session. The mobile application UI 111 may be populated with state and status data from the managed device 2. A user command is received from the mobile application UI 111 in step 404. Test step 405 determines whether or not changes to the managed device 2 and if not, the process returns to step 403 to await the next command from the user.

When test step 405 determines that configuration data on the managed device 2 is to be updated, the client device 4 sends a command to the managed device 2 to change one or more of the configuration settings of the managed device 2 in step 406. Test step 407 determines whether or not the client device is to perform additional configuration actions, and if so, the process again returns to step 403 to await the next command from the mobile application UI 111. When test step 407 determines that the configuration session is ending and no additional configuration actions are to be taken, step 408 updates the capabilities database 112 on the Internet-based cloud server 101. Test step 409 next determines whether or not another configuration session is to be performed for another managed device 2, and if so, the process 400 returns to step 401 to retrieve the capabilities data for the additional managed device and builds the mobile application UI 111 for the additional device so that the above process may be repeated for this device. If test step 409 determines that no additional managed devices 2 are to be configured, the process 400 ends.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs or algorithms. The software, applications, computer programs or algorithms can be stored on a non-transitory computer-readable medium for causing a computer, such as the one or more processors, to execute the steps described in FIGS. 3 and 4. For example, the one or more memories store software or algorithms with executable instructions and the one or more processors can execute a set of instructions of the software or algorithms in association with providing monitoring and installation enhancements in any number of wireless networks in accordance with the embodiments described in the present disclosure.

The software and computer programs, which also can be referred to as programs, software applications, applications, components or code include machine instructions for a programmable processor, and can be implemented in a high-level procedural language, an object-oriented programming language, a functional programming language, a logical programming language, an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. A client device for configuration of a managed device that is creating or being added to a wireless network, the wireless network configured to communicatively interconnect the managed device and one or more client devices to the Internet, the client device comprising:
   a memory having instructions stored thereon; and
   a processor configured to execute the instructions on the memory to cause the client device to:
      retrieve user defined capabilities data and managed service defined capabilities data from an Internet-based cloud server, wherein the user defined capabilities and the managed service defined capabilities control operation of one or more functions performed by the managed device;
      build a user interface (UI) based upon the user defined capabilities data and the managed service defined capabilities data;
      send a request to the managed device once the UI has been constructed;
      receive managed device state data from the managed device based on the request; and
      send a command to update the managed device based on the managed device state data.

2. The client device according to claim 1, wherein the processor further configured to execute the instructions on the memory to cause the client device to:
   instruct the managed device to send current capabilities data to the Internet-based cloud server when managed device update is complete.

3. The client device according to claim 1, wherein the processor further configured to execute the instructions on the memory to cause the client device to:
   send a current capabilities data to the Internet-based cloud server when the managed device update is complete.

4. The client device according to claim 1, wherein a managed service operator updates a set of dynamic capabilities for the managed device.

5. The client device according to claim 4, wherein the managed service operator operates the Internet-based cloud server; and
   the managed service operator comprises an internet service provider, a wireless network operator, and the managed device manufacturer.

6. The client device according to claim 2, wherein the capabilities data stored within the Internet-based cloud server is updated according to a predefined schedule.

7. The client according to claim 1, wherein the managed device comprises a modem device, a router device, and a gateway device.

8. A method for network device configuration of a managed device that is creating or being added to a wireless network, the wireless network configured to communicatively interconnect the managed device including a network controller and one or more client devices to the Internet, the method comprising:
   retrieving user defined capabilities data and managed service defined capabilities data from an Internet-based cloud server, wherein the user defined capabilities and the managed service defined capabilities control operation of one or more functions performed by the managed device;
   building a user interface (UI) based upon the user defined capabilities data and managed service defined capabilities data;
   sending a request to the managed device once the UI has been constructed;
   receiving managed device state data from the managed device based on the request; and
   sending a command to update managed device based on the managed device state data.

9. The method according to claim 8, wherein the processor further configured to execute the instructions on the memory to cause the client device to:
   instructing the managed device to send current capabilities data to the Internet-based cloud server when the managed device update is complete.

10. The method according to claim 8, wherein the processor further configured to execute the instructions on the memory to cause the client device to:
    sending a current capabilities data to the cloud server when the managed device update is complete.

11. The method according to claim 9, wherein a managed service operator updates the set of managed service defined capabilities data for the managed device.

12. The method according to claim 11, wherein the managed service operator operates the Internet-based cloud server; and
    the managed service operator comprises an internet service provider, a wireless network operator, and the managed device manufacturer.

13. The method according to claim 11, wherein the capabilities data stored within the Internet-based cloud server is updated according to a predefined schedule.

14. The method according to claim 8, wherein the managed device comprises a modem device, a router device, and a gateway device.

15. A non-transitory computer-readable recording medium in a client device for network device configuration of a managed device that is creating or being added to a wireless network, the wireless network configured to communicatively interconnect the managed device and one or more client devices to the Internet, the non-transitory computer-readable recording medium storing one or more programs which when executed by a client device performs steps comprising:
    retrieving user defined capabilities data and managed service defined capabilities data from an Internet-based cloud server, wherein the user defined capabilities data and the managed service defined capabilities data control operation of one or more functions performed by the managed device;
    building a user interface (UI) based upon the user defined capabilities data and managed service defined capabilities data;
    sending a request to the managed device once the UI has been constructed;
    receiving managed device state data from the managed device based on the request; and
    sending a command to update the managed device based on the managed device state data.

16. The non-transitory computer-readable recording medium according to claim 15, wherein the processor further configured to execute the instructions on the memory to cause the client device to:
    instructing the managed device to send current capabilities data to the Internet-based cloud server after the managed device update is complete.

17. The non-transitory computer-readable recording medium according to claim 15, wherein the processor further configured to execute the instructions on the memory to cause the client device to:

sending a current capabilities data to the Internet-based cloud server when managed device update is complete according to a predefined schedule.

18. The non-transitory computer-readable recording medium according to claim 15, wherein a managed service operator updates the set of dynamic capabilities for the managed device.

19. The non-transitory computer-readable recording medium according to claim 18, wherein the wherein the Internet-based cloud server is operated by the managed service operator; and the managed service operator comprises an internet service provider, a wireless network operator, and the managed device manufacturer.

20. The non-transitory computer-readable recording medium according to claim 15, wherein the capabilities data is updated according to a predefined schedule.

* * * * *